(12) United States Patent
Byrd et al.

(10) Patent No.: US 7,072,463 B1
(45) Date of Patent: Jul. 4, 2006

(54) APPARATUS AND METHOD FOR PROGRAMMABLE LINE INTERFACE IMPEDANCE MATCHING

(75) Inventors: Russell Byrd, Rancho Cordova, CA (US); James M. Little, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 1295 days.

(21) Appl. No.: 09/660,255

(22) Filed: Sep. 12, 2000

(51) Int. Cl.
*H04M 1/00* (2006.01)

(52) U.S. Cl. .............. 379/399.01; 379/403; 379/404; 379/413.01

(58) Field of Classification Search ............ 379/394, 379/398, 399.01, 402, 413.02, 93.05, 93.06, 379/93.07; 333/32
See application file for complete search history.

(56) References Cited

U.S. PATENT DOCUMENTS

| | | | | | |
|---|---|---|---|---|---|
| 5,596,569 | A | * | 1/1997 | Madonna et al. | 370/217 |
| 5,802,169 | A | * | 9/1998 | Frantz et al. | 379/398 |
| 6,330,138 | B1 | * | 12/2001 | Kwon | 361/58 |
| 6,553,117 | B1 | * | 4/2003 | Armistead et al. | 379/398 |
| 6,611,580 | B1 | * | 8/2003 | Dahan et al. | 379/93.29 |
| 6,665,399 | B1 | * | 12/2003 | Gorcea et al. | 379/399.01 |

* cited by examiner

*Primary Examiner*—Curtis Kuntz
*Assistant Examiner*—Tuan Pham
(74) *Attorney, Agent, or Firm*—Kenneth J. Cool

(57) ABSTRACT

A line interface capable of connecting to a variety of transport mediums, each having a different impedance. The line interface comprises a programmable resistor. The programmable resistor along with an external resistor provide a range of resistor values which are used to substantially match the impedance requirements of the various transport mediums.

12 Claims, 5 Drawing Sheets

APPARATUS AND METHOD FOR PROGRAMMABLE LINE INTERFACE IMPEDANCE MATCHING

BACKGROUND OF THE INVENTION

1. Field of the Invention

This invention relates generally to the field of network circuitry. More particularly, the invention relates to a more versatile line interface for connecting a receiver to various transport mediums (e.g., data lines) hosting transport protocols that have different impedance requirements.

2. Description of Related Art

Various transport protocols are used to transport data across transport mediums. Transport protocols are defined by various industry specifications. For example, the T1 protocol (also called DS1) is specified by the American National Standards Institute (latest revision T1.403.00, 403.01, 403.02-1999). The E1 protocol (or E-1) is a European digital transmission format devised by the International Telecommunication Union (ITU-T) and is compliant with G703 (latest revision October, 1998). Similarly, the J1 protocol, used in Japan, is specified by the Telecommunication Technology Committee (latest revision JT-G703, April, 1989).

When a connection is made to a transport medium hosting a particular transport protocol, the line interface, or connector, must have a substantially similar impedance to that specified by the transport protocol, otherwise electrical reflection will occur causing interference, as is well known.

FIG. 1 shows a prior art line interface for connecting a receiver to a transport medium (line 110). The line 110 is connected to a tip input 140 and a ring input 142 of the receiver portion of transceiver 150 via a transformer 120. A resistor 130 is used to provide an impedance for matching the impedance of line 110. For example, a T1 line according to the ANSI T1 specification has a nominal terminating impedance at the interface of 100 ohms. The T1 specification also specifies a return loss with respect to 100 ohms over the frequency band from 100 kHz to 1 Mhz of at least 26 dB.

The return loss is determined by the equation:

20 log10 [$(Z_T+Z_L)$/Abs$(Z_T-Z_L)$], where $Z_T$ is the impedance of the line interface, $Z_L$ is the impedance of the line, and Abs is the absolute value function. It is clear that the closer $Z_T$ is to $Z_L$, the higher the return loss. If $Z_T$ is not close enough to $Z_L$, the return loss requirement of the T1 specification will not be met. The term "substantially match" used herein denotes meeting the specification of the transport protocol.

In this prior art line interface, if the transceiver is subsequently connected to a transport medium that has a different impedance requirement, then the external resistor is physically replaced with a corresponding resistor. For example, a J1 line requires a nominal termination impedance of 110 ohms; an E1 line (coax line) requires a nominal termination impedance of 75 ohms; and an E1 line (twisted pair line) requires a nominal termination impedance of 120 ohms. In the prior art line interface, the external resistor would be switched to match the nominal termination impedance of the new transport medium and transport protocol.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An Exemplary Line Interface

Figure 1:
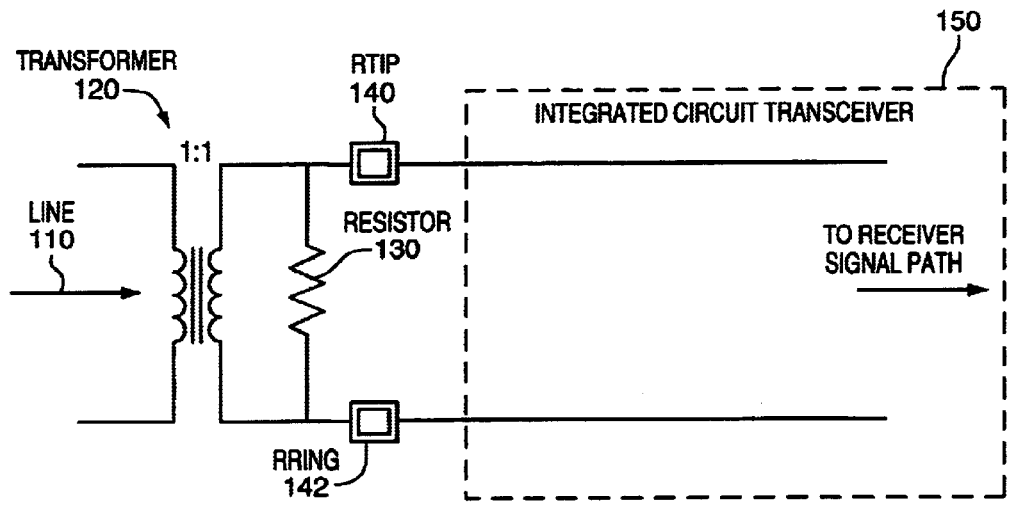
FIG. 1 shows a prior art line interface for connecting a receiver to a transport medium.
Figure 2:
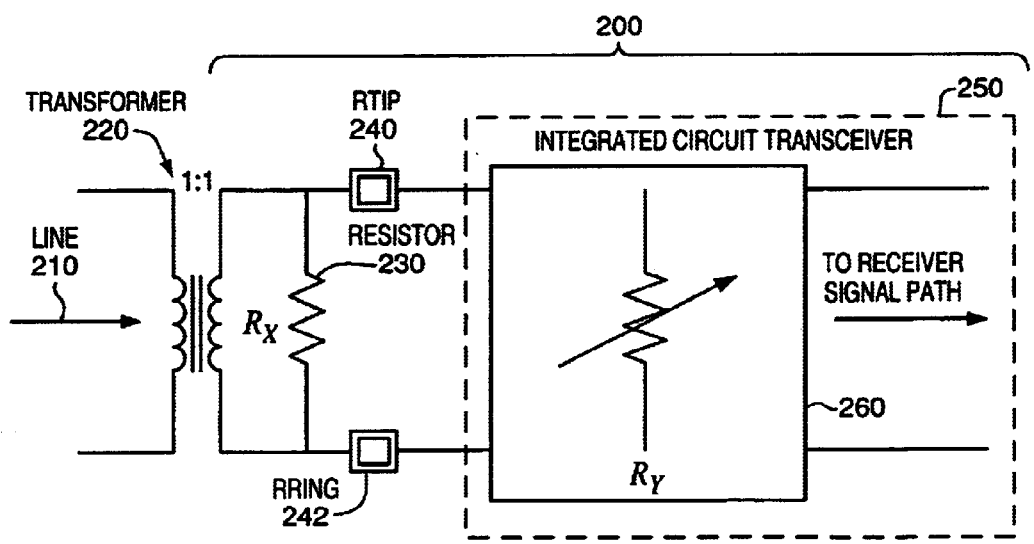
FIG. 2 shows an exemplary line interface for a receiver having a programmable resistor to receive data across transport mediums having different impedance requirements.

FIG. 2 shows an exemplary line interface for a receiver having a programmable resistor to receive data across transport mediums having different impedance requirements. For example, a transport medium such as line 210 may carry any of several different transport protocols such as those previously mentioned. In one case, line 210 may carry a transport protocol having an impedance requirement of 100 ohms. In another case, or at a different point in time, the line 210 may carry a transport protocol having an impedance requirement of 110 ohms. Alternatively, the line 210 may have an impedance requirement of 120 ohms.

A 1:1 transformer 220 and an external resistor 230 couple line 210 to a receiver portion of integrated circuit (IC) transceiver 250 at receiver tip and ring inputs 240 and 242. The IC transceiver has an adjustable resistance $R_Y$ 260 that is electrically programmable. The combined effective resistance of both the external resistor 230 in parallel with the adjustable resistance $R_Y$ 260 is used to match the impedance of the line 210. Because the IC transceiver 250 has an adjustable resistance $R_Y$, the line interface 200 is able to match the impedances of line 210 for various transport protocols and transport mediums without the need to physically change the external resistor 230.

The use of an adjustable resistance $R_Y$ 260 in the IC transceiver facilitates the process of switching from one transport medium to another since modification of the resistance can be done in software. Additionally, by keeping adjustable resistance $R_Y$ 260 relatively low compared to $R_X$, the majority of power dissipation will be in the external resistor $R_X$ and not in the IC.

Figure 3:
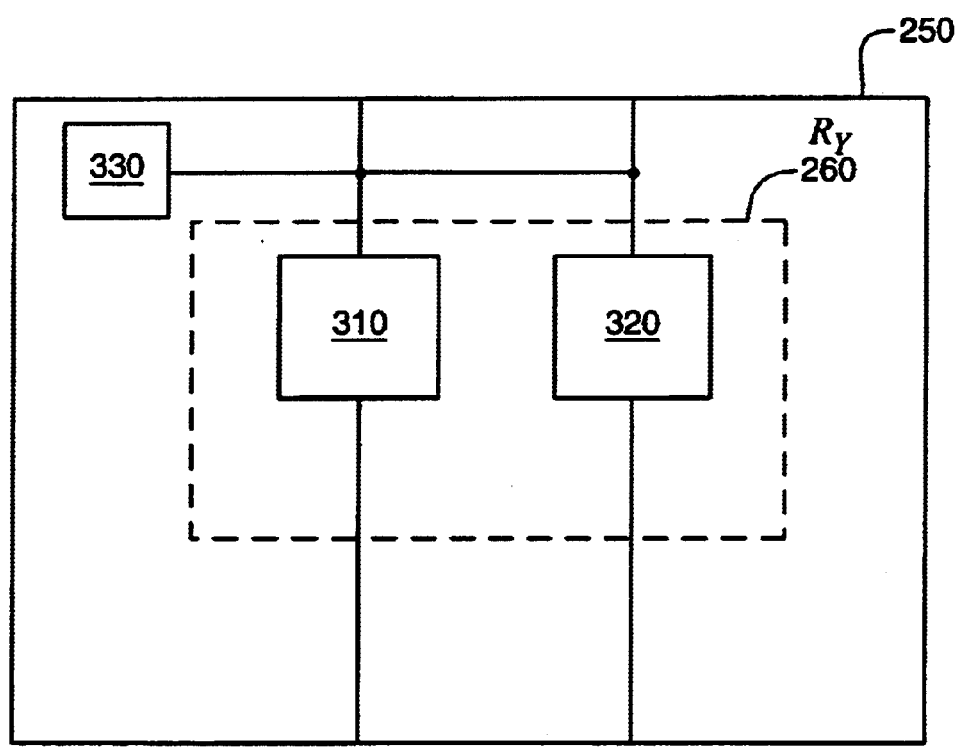
FIG. 3 shows a block diagram of one embodiment of an exemplary adjustable resistor circuit $R_Y$ in an IC receiver.

FIG. 3 shows a block diagram of one embodiment of an exemplary adjustable resistor circuit $R_Y$ 260 in an IC receiver 250. One resistor circuit block 310 is enabled to provide a first IC resistance. Alternatively, the other resistor circuit block 320 is enabled to provide a second IC resistance. A register 330 is used to select whether either resistor circuit block 310 or 320 is enabled or disabled. This is done via transmission gates or other well-known means.

In this embodiment, an effective termination resistance $R_T$ comprises the internal IC resistance in parallel with the external resistance $R_X$. Thus, the effective termination resistance of the parallel resistors is $R_T = R_X R_Y/(R_X+R_Y)$, where $R_X$ is the external resistance, and $R_Y$ is the internal IC resistance.

If both resistor circuit blocks 310 and 320 are disabled, then $R_Y$ is an open circuit and the effective termination resistance $R_T$ is merely the external resistor $R_X$.

In one embodiment, the external resistor $R_X$ has a value of 121 ohms +/−1%, and resistor circuit blocks 310 and 320 in parallel with $R_X$ provide an effective termination resistance $R_T$ of 100 ohms +/−5% and 110 ohms +/−5%, respectively. If both resistor blocks 310 and 320 are disabled, an effective termination resistance $R_T$ of 120 ohms +/−5% is provided. Of course, additional resistor blocks can be added and/or the resistor blocks could provide other effective termination resistance values such as 75 ohms (e.g., for an E1 coaxial cable). However, lower resistances 110 dissipate more power in the receiver. One alternative for the line termination to accommodate 75 ohms +/−5% is by inserting an external balun (transformer) between the line 210 and the transformer 230. The programmable resistor R, and an external balun can be used in combination for providing a 75 ohms +/−5% line termination.

Figure 4:
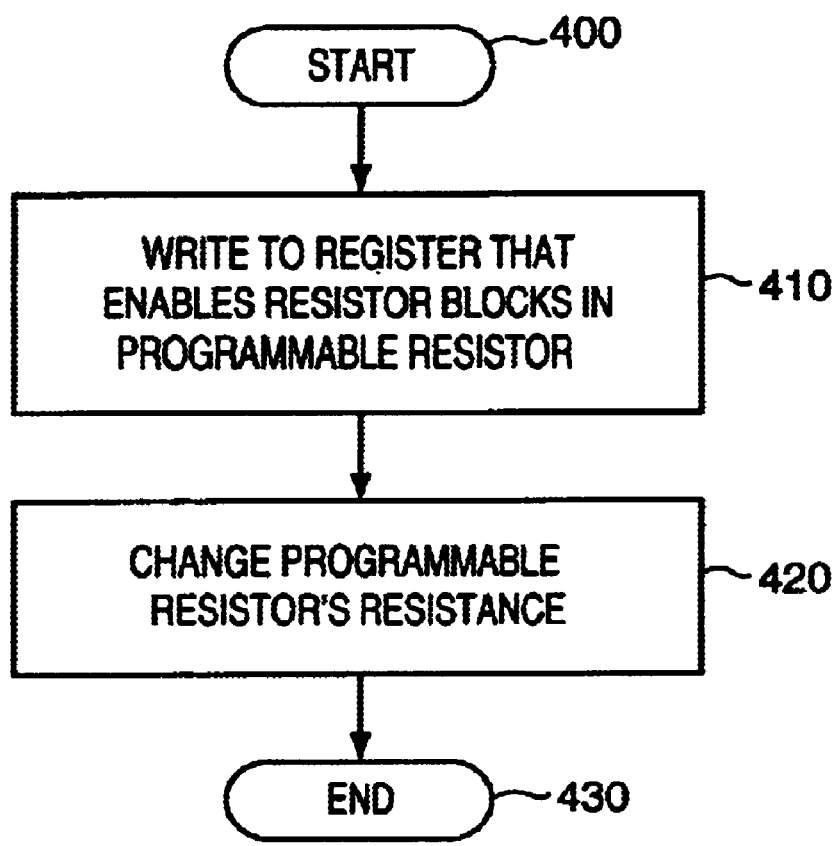
FIG. 4 shows a flowchart showing an example of setting the effective termination resistance RT to a predetermined value.

FIG. 4 shows a flowchart showing an example of setting the effective termination resistance $R_T$ to a predetermined value. Typically this procedure is done upon initialization when a new line 210 is attached to the transceiver.

The flowchart starts at box 400 and proceeds to box 410 at which a write to register 330 is performed. The bit value written to register 330 determines whether to enable either resistor circuit 310 or 320 or neither circuit block based on the desired $R_T$ to match the new line 210. Based on the value written to register 330, the adjustable resistor $R_Y$'s value is changed as shown in box 420.

Figure 5:
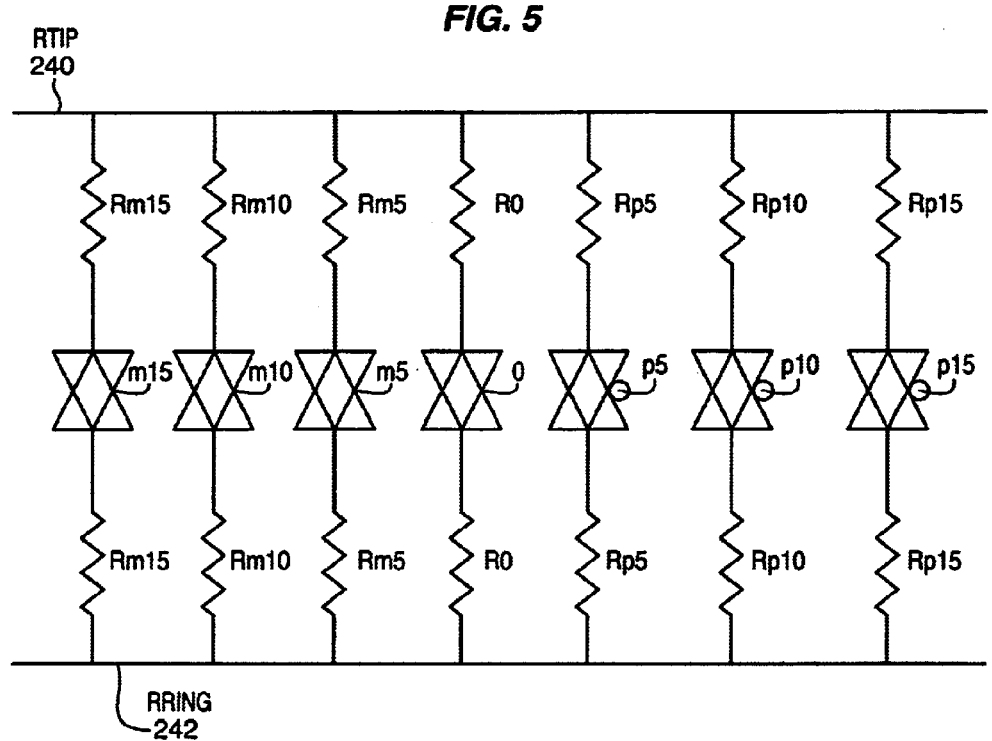
FIG. 5 shows one embodiment of resistor circuit block 310 that allows trimming of the resistance.

FIG. 5 shows one embodiment of resistor circuit block 310 that allows trimming of the resistance. Trimming is a way of fine tuning the resistance value of the resistor circuit because the resistance provided by resistors on an IC may vary by up to around 20% due to variations in process, temperature, and voltage. In one embodiment, seven pairs of resistors are coupled in parallel with transmission gates M15, M10, M5, 0, P5, P10, and P15 between the resistor pairs as shown in FIG. 5. A trim register (not shown) is used to enable or disable particular transmission gates. For example, various combinations of 3-bit values written to the trim register can result in each of the resistor configurations shown in Table 1 (below). In this embodiment, the resistors are set up so that a nominal resistance $R_{YNOM}$ is provided when transmission gates 0, P5, P10 and P15 are enabled, but transmission gates M5, M10 and M15 are disabled. In this embodiment, if the nominal resistance $R_{YNOM}$ differs from the resistance value desired, then a resistor is either enabled to lower $R_{YNOM}$ or disabled to raise $R_{YNOM}$.

For example, in this embodiment, the value of $R_{M5}$ is selected such that when it is enabled (by enabling gate M5), $R_{YNOM}$ is reduced by 5%. Similarly, $R_{M10}$ is selected such that when it is enabled, $R_{YNOM}$ is reduced by 10%; and $R_{M15}$ reduces $R_{YNOM}$ by 15% when enabled. Additionally, $R_{P5}$ is selected such that when it is disabled, $R_{YNOM}$ increases by 5%; $R_{P10}$ when disabled increases $R_{YNOM}$ by 10%; and $R_{P15}$ when disabled increases $R_{YNOM}$ by 15%. Table 1 shows the various configurations of transmission gates and the corresponding resistance of the adjustable resistor circuit as was just described. An 'X' in the table indicates the transmission gate is enabled. It should be noted that there is no IC resistor configuration that uses a single path of resistance between RTIP 240 and RRING 242. This helps reduce electron migration which improves the lifetime of the IC resistors.

TABLE 1

| $R_{M15}$ | $R_{M10}$ | $R_{M5}$ | $R_0$ | $R_{P5}$ | $R_{P10}$ | $R_{P15}$ | Resistance |
|---|---|---|---|---|---|---|---|
|  |  |  | X | X | X | X | $R_{YNOM}$ |
|  |  |  | X |  | X | X | 1.05 $R_{YNOM}$ |
|  |  |  | X | X |  | X | 1.10 $R_{YNOM}$ |
|  |  |  | X | X | X |  | 1.15 $R_{YNOM}$ |
|  |  | X | X | X | X | X | .95 $R_{YNOM}$ |
|  | X |  | X | X | X | X | .90 $R_{YNOM}$ |
| X |  |  | X | X | X | X | .85 $R_{YNOM}$ |

Because the total current flowing through parallel resistors is the same as the current flowing through an equivalent resistor, the following equations $$I = V/R_{EQ} = V/R1 + V/R2 + V/R3 + \ldots$$

and $R_{EQ} = 1/(1/R1 + 1/R2 + 1/R3 + \ldots)$ allow us to convert the various configurations of enabled resistors shown in Table 1 into the following equations:

$$1/((\tfrac{1}{2}R_0)+(\tfrac{1}{2}R_{P5})+(\tfrac{1}{2}R_{P10})+(\tfrac{1}{2}R_{P15})) = R_{YNOM} \quad (EQ.\ 2)$$

$$1/((\tfrac{1}{2}R_0)+(\tfrac{1}{2}R_{P10})+(\tfrac{1}{2}R_{P15})) = 1.05 R_{YNOM} \quad (EQ.\ 3)$$

$$1/((\tfrac{1}{2}R_0)+(\tfrac{1}{2}R_{P5})+(\tfrac{1}{2}R_{P15})) = 1.10 R_{YNOM} \quad (EQ.\ 4)$$

$$1/((\tfrac{1}{2}R_0)+(\tfrac{1}{2}R_{P5})+(\tfrac{1}{2}R_{P10})) = 1.15 R_{YNOM} \quad (EQ.\ 5)$$

$$1/((\tfrac{1}{2}R_{M5})+(\tfrac{1}{2}R_0)+(\tfrac{1}{2}R_{P5})+(\tfrac{1}{2}R_{P10})+(\tfrac{1}{2}R_{P15})) = 0.95 R_{YNOM} \quad (EQ.\ 6)$$

$$1/((\tfrac{1}{2}R_{M10})+(\tfrac{1}{2}R_0)+(\tfrac{1}{2}R_{P5})+(\tfrac{1}{2}R_{P10})+(\tfrac{1}{2}R_{P15})) = 0.90 R_{YNOM} \quad (EQ.\ 7)$$

$$1/((\tfrac{1}{2}R_{M15})+(\tfrac{1}{2}R_0)+(\tfrac{1}{2}R_{P5})+(\tfrac{1}{2}R_{P10})+(\tfrac{1}{2}R_{P15})) = 0.85 R_{YNOM} \quad (EQ.\ 8)$$

If $R_0$ is chosen to be the smallest resistor in the resistor circuit and is used as a unit resistor, then $R_{M5}=k_{M5}*R_0$, $R_{M10}=k_{M10}*R_0$, $R_{M15}=k_{M15}*R_0$, $R_{P5}=k_{P5}*R_0$, $R_{P10}=k_{P10}*R_0$, and $R_{P15}=k_{P15}*R_0$, where $k_{M5}$, $k_{M10}$, $k_{M15}$, $k_{P5}$, $k_{P10}$, and $k_{P15}$ are unit resistor coefficients. Solving for equations 2–8 for the unit resistor coefficients yields the following approximations (rounded to nearest half integer): $R_{M5}=14*R_0$, $R_{M10}=6.5*R_0$, $R_{M15}=4*R_0$, $R_{P5}=15*R_0$, $R_{P10}=8*R_0$, $R_{P15}=5.5*R_0$.

As an example, for an effective termination resistance of 100 ohms, and external resistor $R_X$ of 121 ohms:

$$R_{YNOM} = (R_X*R_T)/(R_X-R_T) = (121*100)/(121-100) = 576 \text{ ohms, and}$$

$R_0 = 396$ ohms.

For an effective termination resistance of 110 ohms, and external resistor $R_X$ of 121 ohms:

$$R_{YNOM} = (R_X*R_T)/(R_X-R_T) = (121*110)/(121-110) = 1210 \text{ ohms, and}$$

$R_0 = 831$ ohms.

Note that for the actual implementation of the programmable integrated circuit resistor, the unit resistor values are adjusted for the finite on-resistance of the transmission gates and for the rounding of the unit resistor coefficients. The resistor values may also be adjusted for contact and metal resistances.

Figure 6:
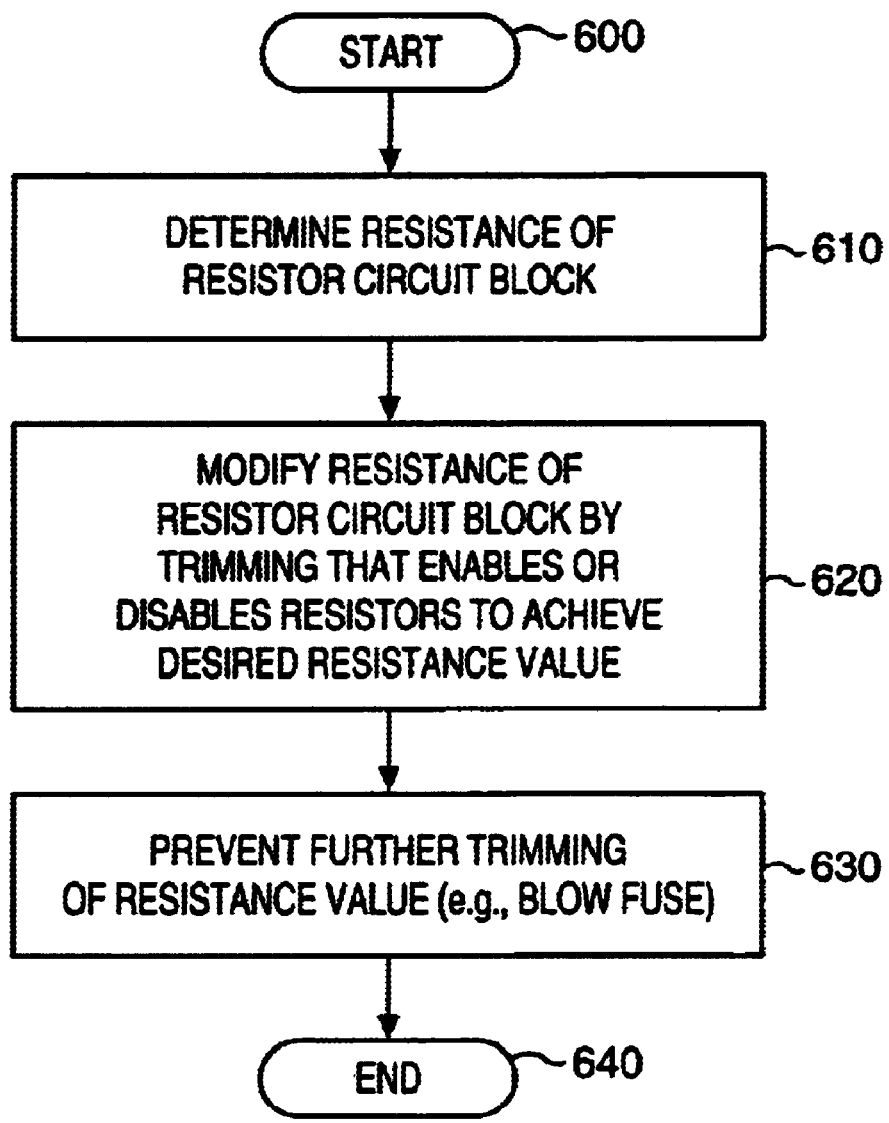
FIG. 6 shows a flowchart of the process of trimming one of the resistor circuit blocks 310 and 320 of the adjustable resistance $R_Y$.

FIG. 6 shows a flowchart showing the process of trimming one of the circuit blocks 310 or 320. In one embodiment, both resistor circuit blocks 310 and 320 are trimmed identically since the resistance variation due to process is consistent across the IC. Thus, the same resistors would be enabled and disabled in each resistor circuit block.

The flowchart starts at block 600 and proceeds to block 610 at which the IC resistance $R_Y$ is determined. This may be done using an IC tester or an ohm-meter. Once the value of the resistor circuit is determined, it may be modified in block 620 by enabling or disabling the appropriate resistor to decrease or increase the resistance. In one embodiment, only one resistor is enabled or disabled, and each of the resistors adds an increment or decrement of a predetermined percentage of the resistance. For example, the resistance can be increased or decreased by 5%, 10%, or 15%.

After the resistance has been trimmed to the desired value, further trimming of the resistance value $R_Y$ may optionally be disabled (block 630). This may be done by a variety of different methods including blowing a fuse on the IC. Subsequently, a resistor circuit block could be enabled or disabled but the resistance 110 value of the resistor circuit block could no longer be trimmed.

Thus, an apparatus and method for a programmable line interface for impedance matching is described. Throughout the foregoing description, for the purposes of explanation, numerous specific details were set forth in order to provide a thorough understanding of the invention. It will be apparent, however, to one skilled in the art that the invention may be practiced without some of these specific details. For example, the programmable resistance could be accomplished by resistors in series as well as in parallel; and the IC may have multiple independent receivers and/or transceivers, each capable of coupling to line interfaces with different effective termination resistances. Accordingly, the scope and spirit of the invention should be judged in terms of the claims that follow.

What is claimed is:

1. In a line interface having a programmable resistor, a method of matching an impedance of a transport medium comprising:

determining the resistance of the IC corresponding to a first configuration of parallel resistors, wherein a portion of the parallel resistors are enabled, at least one or more of the parallel resistors being disposed within the IC;

modifying the resistance of the IC by creating a second configuration of parallel resistors, wherein a different portion of the parallel resistors are enabled; and wherein a desired impedance is provided by a combination of the resistance of the IC and an external terminating impedance external to the IC.

2. The method of claim 1 wherein the modifying the resistance is performed by writing to a register on the IC.

3. The method of claim 1 further comprising:

permanently disabling a subsequent modification of the second configuration of parallel resistors.

4. The method of claim 3 further comprising:

controlling the entire second configuration of parallel resistors to be enabled and disabled.

5. The method of claim 3, wherein permanently disabling of a subsequent modification is achieved by blowing a fuse on the IC.

6. The method of claim 1, wherein modifying the resistance of the IC is performed by enabling a resistor of the parallel resistors to reduce the resistance of the IC by a professional percentage.

7. The method of claim 1, wherein modifying the resistance of the IC is performed by disabling a resistor of the parallel resistors to increase the resistance of the IC by a predetermined percentage.

8. In a line interface having a programmable resistor, a method of matching an impedance of a transport medium comprising:

writing to a register that controls the programmable resistor, wherein the programmable resistor is disposed within an integrated circuit to couple to the transport medium; and changing the programmable resistor to provide an effective impedance substantially matching the impedance of the transport medium responsive to writing to the register, wherein the effective impedance is provided by a combination of the programmable resistor and a terminating impedance external to the integrated circuit.

9. The method of claim 8 wherein changing the programmable resistor is accomplished by disabling the programmable resistor.

10. The method of claim 8 further comprising:

coupling the line interface to the transport medium.

11. The method of claim 10, wherein the transport medium supports a T1, J1, or E1 transport protocol.

12. The method of claim 8 wherein the programmable resistor is changed to provide the effective impedance of 75 ohms, 110 ohms, or 120 ohms.

* * * * *